United States Patent [19]
Farsai

[11] Patent Number: 5,388,937
[45] Date of Patent: Feb. 14, 1995

[54] WHEELCHAIR SECUREMENT DEVICE FOR TRANSIT VEHICLES

[76] Inventor: Ali J. Farsai, 7241 NE. 160th St., Bothell, Wash. 98011

[21] Appl. No.: 172,433

[22] Filed: Dec. 23, 1993

[51] Int. Cl.$^6$ ............................................. B60P 3/06
[52] U.S. Cl. ....................................... 410/9; 188/32; 410/30; 414/921
[58] Field of Search ............... 414/537, 401, 396, 921; 188/32; 410/19, 30, 49

[56] References Cited

U.S. PATENT DOCUMENTS

| | | | |
|---|---|---|---|
| 3,628,466 | 12/1971 | Lyons et al. | 410/49 |
| 3,922,004 | 11/1975 | Chamberlain | 410/49 |
| 4,027,747 | 6/1977 | Moorman | 410/30 |
| 4,122,629 | 10/1978 | Rennick | 188/32 |
| 4,267,748 | 5/1981 | Grunewald et al. | 414/401 |
| 4,511,171 | 4/1985 | Petersen | 188/32 |
| 4,659,266 | 4/1987 | Thelen et al. | 410/19 |
| 4,771,867 | 9/1988 | Fernandes | 188/32 |
| 5,122,024 | 6/1992 | Stokes | 414/921 |
| 5,173,018 | 12/1992 | Kissel et al. | 410/30 |

FOREIGN PATENT DOCUMENTS 4013187  10/1990  Germany ............................. 188/32

*Primary Examiner*—Michael S. Huppert
*Assistant Examiner*—Thomas J. Brahan

[57] ABSTRACT

An automatic push button wheelchair securement device for mounting on the floor of a wheelchair transporting vehicle.

As the wheelchair occupant rolls the wheelchair to the designated location on the securement device; by pressing a push button the holding flaps of the securement device will rise by means of two air cylinders to contact the rear large wheels tangentially, hence, providing securement for the chair and preventing it from rolling forward or backward in case of sudden stops or collision of the vehicle.

The holding flaps, in another embodiment may be comprised of four individual holding flaps self adjusted and positioned by means of electrical linear actuator and infrared sensing device.

1 Claim, 3 Drawing Sheets

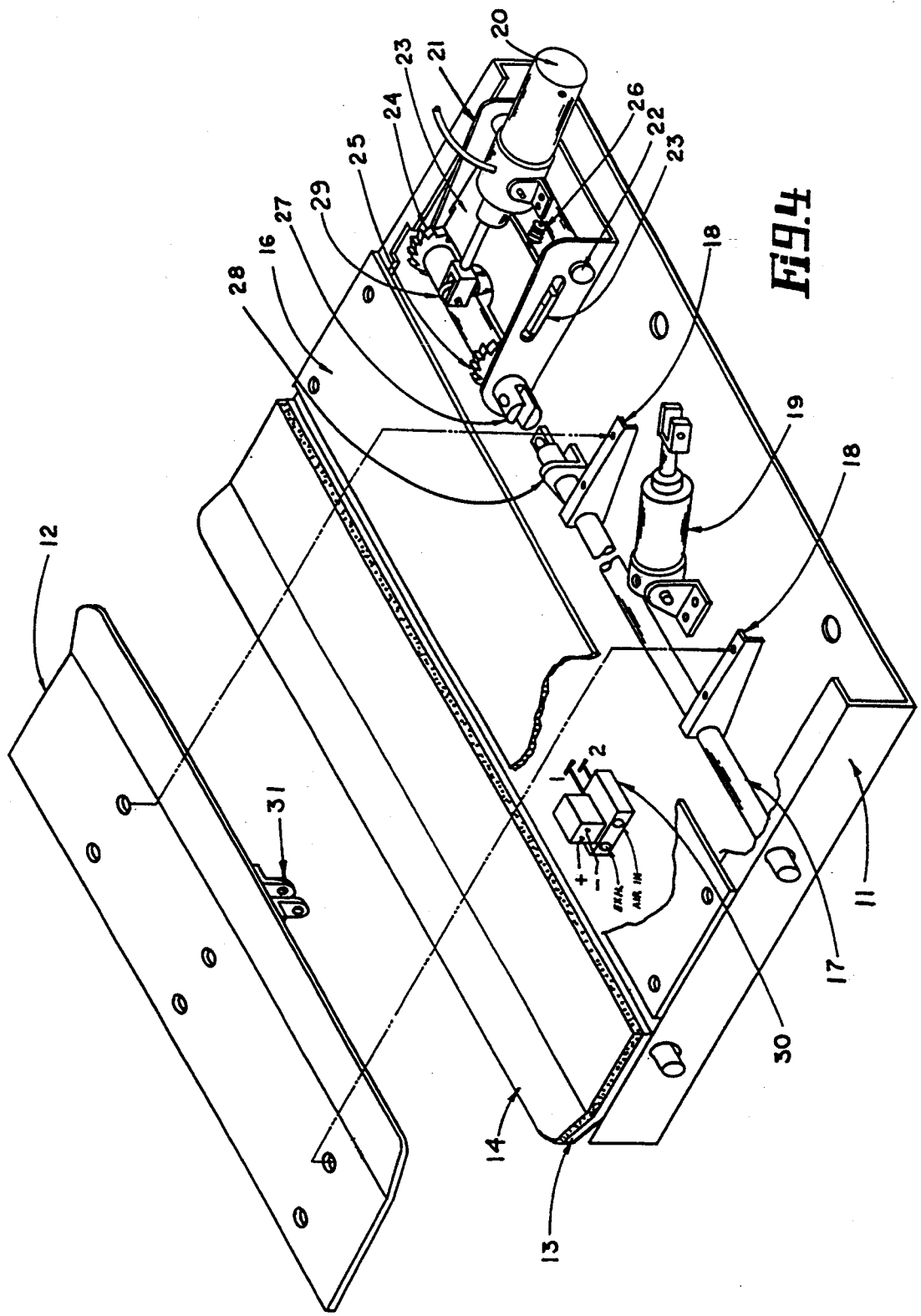

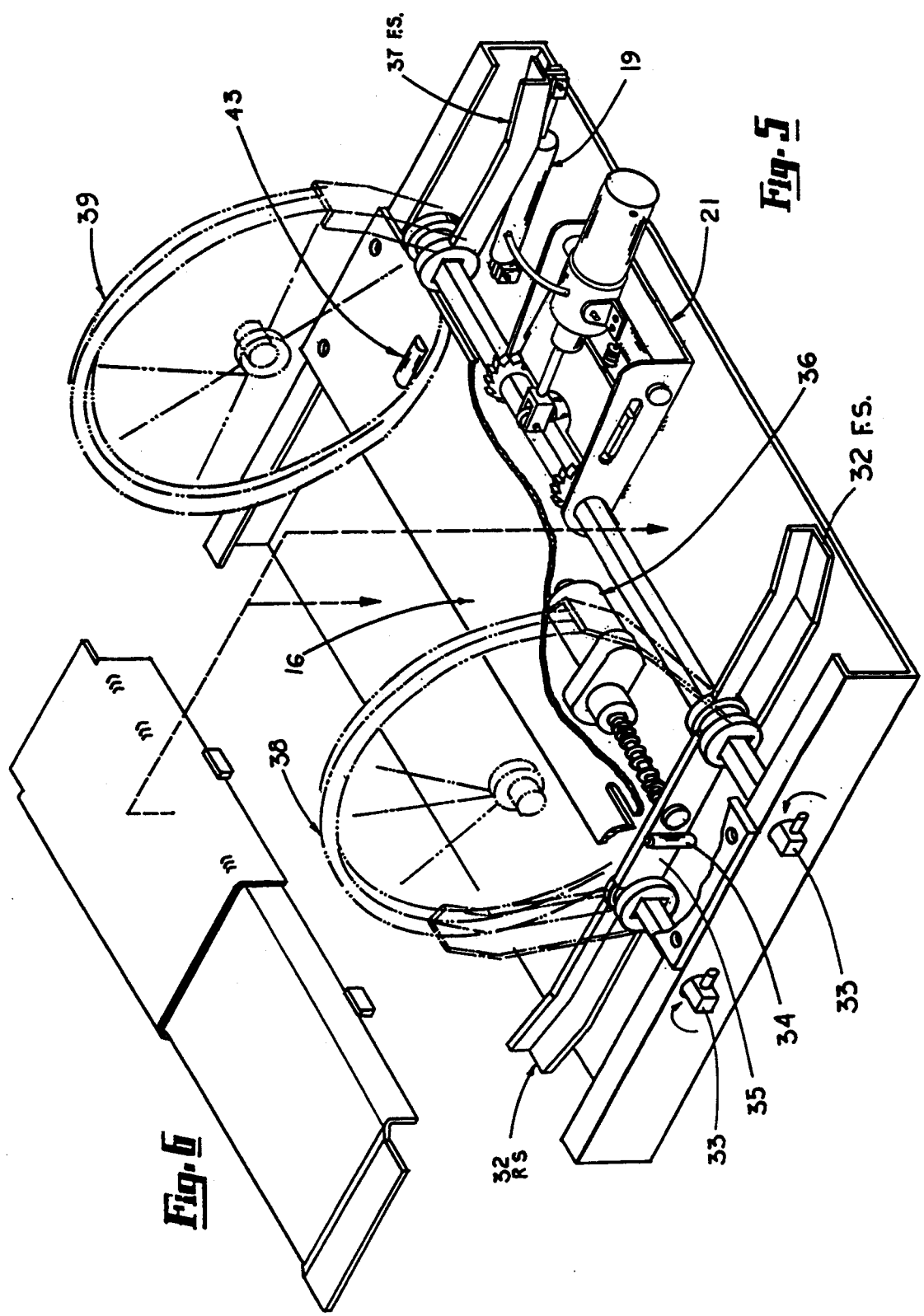

WHEELCHAIR SECUREMENT DEVICE FOR TRANSIT VEHICLES

BACKGROUND-FIELD OF INVENTION

It is a well established fact that the primary cause of serious injury to the motor vehicle occupants in a crash or sudden stop is the "human collision" or second impact whereas the severity, is more pronounced when the occupant is a disabled wheelchair occupant. An effective occupant protection system must provide both wheelchair securement and an integrated occupant restraint system.

The securement device is best if it can accommodate for all various wheelchair wheel diameters or wheel distances.

The ideal would be an automatic securement device which would secure all wheelchairs regardless of the wheel size or wheel distance.

Although there is an automatic wheelchair holding device entering the market; but it requires modification and extra steel attachments to the wheelchairs in order to make them capable of utilizing the vehicle device, The idea has not received enthusiastic response from the wheelchair manufacturers or the disable users of the wheelchairs.

My present invention is providing a universal securement device to be used in vehicles for public transit or private for wheelchairs regardless of the wheel diameters or wheel distances.

My present invention is designed to deal with crash-level forces and with adherence to established crashworthiness design principles.

My invention provides automatic push button reachable by hand in front of the wheelchair occupant for engagement or release of the securement device. My invention provides an auxiliary push button with the indicating light operable by the driver of the vehicle to indicate on off mode of the device.

My invention does not require any modification or special attachments to the wheelchairs in order to make them accessible to the securement device.

OBJECTS OF INVENTION

One object of the present invention is to provide securement for the wheelchair occupant in a transit or private vehicle, in order to prevent the wheelchair from moving forward or backward in sudden stop or collision.

Another object of this invention is to provide independent activation of the device by the wheelchair occupant, without the aid of an assistant, or the driver.

A simple push button with the indicator light can be operated by the occupant or the driver from his driver seat.

DRAWING FIGURES

In the drawings, closely related figures have the same number but different alphabetic suffixes.

FIG. 4 is a overall view of the securement device's base frame showing interior components by removing the right side holding flap and partial of the middle plate.

FIGS. 5 and 6 illustrate another version of this invention, where the two holding flaps are segmented to 4 individual holding flaps.

REFERENCE NUMERALS IN DRAWINGS

10—Wheelchair
11—BASE FRAME ASSEMBLY
12—Holding flap (front side)
13—Holding flap (rear side)
14—Rubber pad or anti-slip tape
15—Ramp
16—Top plate (wheel rest)
17—Axial shaft assembly (pipe)
18—Mounting bracket
19—Air cylinder (holding flap lifting)
20—Air cylinder (ratchet gear lock plate release)
21—Ratchet assembly housing plate
22—Pivoting pin
23—Ratchet gear lock sliding plate
24—Ratchet gear
25—Ratchet gear
26—Spring assembly
27—Ratchet assembly shaft
28—Pillow block
29—Rocker assembly
30—Solenoid valve
31—Bracket assembly for air cylinder
32—Individual holding flap FS(front side) and RS(rear side)
33—Square axial shaft assembly
34—Infrared wheel tire center sensing device
35—Push- pull sliding blade
36—Ball screw linear actuator
37—Individual holding flap FS and RS FIXED on shaft
38—Wheelchair large wheel RH
39—Wheelchair large wheel LH
40—Shoulder strap
41—Lap strap
42—Pole
43—Stop guide Description—FIGS. 1 to 5

Figure 1:
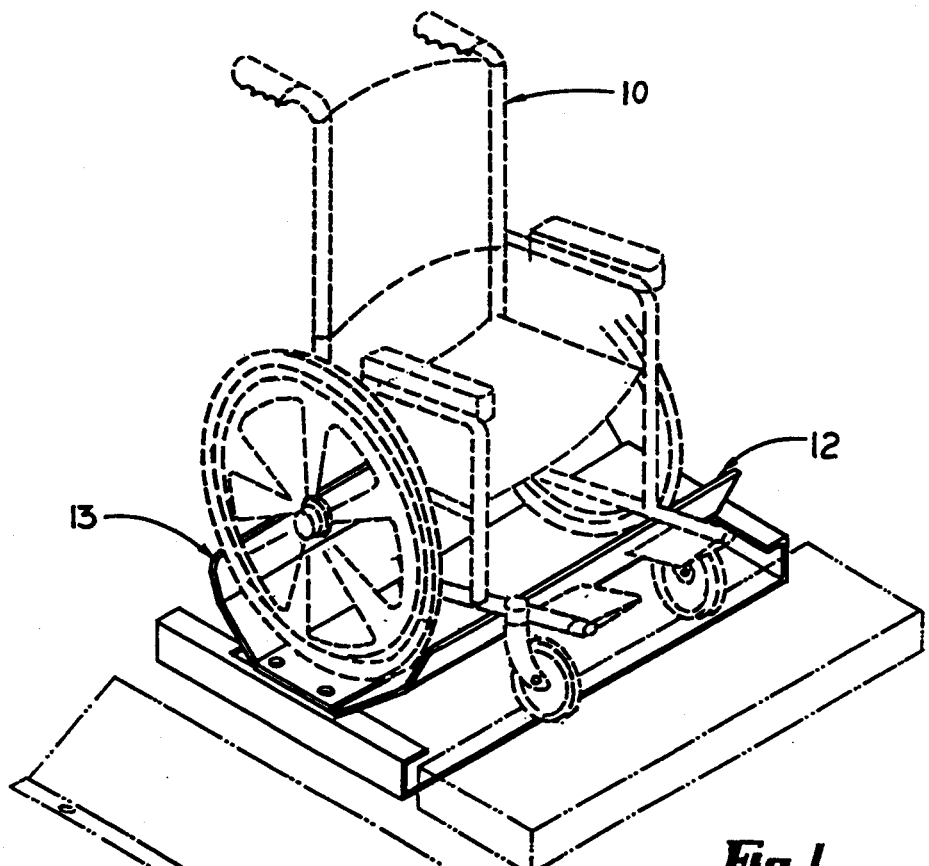
FIG. 1 is isometric view of the wheelchair rested on my securement device.
Figure 2:
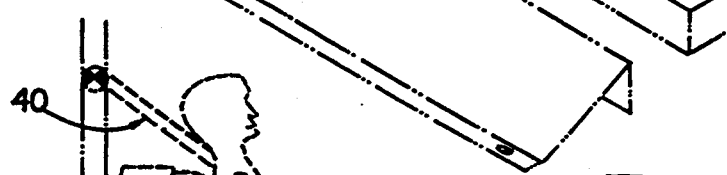
FIG. 2 is showing a ramp for the securement device, if it is installed over the floor of the vehicle.

The assembly 11 in FIG. 1 is installed on the floor of the vehicle. The ramp 15 in FIG. 2 will provide ease for the rolling of the wheelchair on to the securement device.

The occupant then positions the large rear wheels of the wheelchair to the position shown in FIG. 1. The wheelchair occupant or his/her assistant will strap the safety lap and shoulder belts and push the push button (not shown) to engage the holding deflector flaps 12 and 13 to the inclind mode, in order to hold the rear large wheels.

Figure 3:
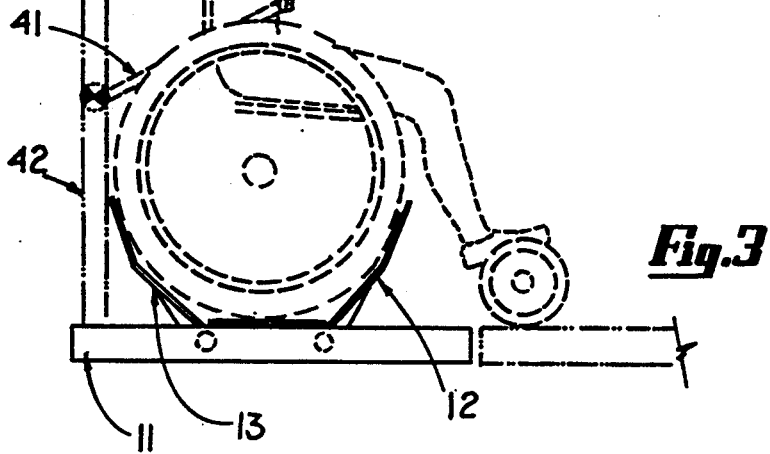
FIG. 3 is a side view of the securement device in an engaged mode and the wheelchair and occupant with lap and shoulder seat belt in place.

The said holding deflector flaps were originally in a horizontal mode when the wheelchair was rolled in to the position. The small front wheels of the wheelchair are not resting on the securement device, but are located on the elevated floor of the vehicle as shown in FIG. 3.

The main embodiment of my invention consists of a steel base frame plate 11 formed as shown in FIG. 4.

A heavy wall steel pipe 17 is pivoting freely inside the said frame 11 and act as the axis of rotation for the said holding flap 12.

For the sake of simplicity only the front side assembly is shown in FIG. 4. The rear side assembly is exactly the mirror image of the front side with exactly the same components which is being described herein:

To the said pipe 17 three identical brackets 18 are welded. To the said brackets the said flap 12 is secured by bolts. The end tronion type air cylinder spring loaded and normally retracted 19 is mounted on the floor of the said base frame, 11. The rod end clevis of the said air cylinder is joined to the bracket assembly 31 on the said flap 12.

The said pipe assembly 17 is having a support pillow block 28. To one end of the said pipe assembly is welded an strong steel flat bar in order to join it to the grooved shaft 27 of the ratchet assembly 21. A high strength steel pin through the joint holes will secure the joint.

The ratchet assembly 21 consists of a channel shaped plate of steel and the entire body of the said assembly is mounted on the floor of the said base frame 11.

The components of the ratchet assembly are as follows:

(a) Shaft 27 with two ratchet gears 24 and 25 welded as shown in FIG. 4 and the said shaft 27 pivots freely in the said channel shaped frame 21.

(b) Locking plate 23 engage and disengage inside the teeth of the said ratchet gears 24 and 25, by sliding back and forth in the slot provided in the said ratchet frame 21 and is spring loaded at 26.

(c) The motion of the said ratchet gear locking plate 23 is provided by a front tonion type single acting, spring loaded normally extended air cylinder 20. The said air cylinder is mounted on a pivoting rod 22.

(d) The rod end clevis of the said air cylinder 20 is pivotally joined to the rocker arm 29.

As the holding flap 12 rises; it rotates along the axis of the said axial pipe 17 and the ratchet gears 24 and 25 freely.

The said spring loaded locking plate 23 allows the free rotation until the said flap 12 is risen to tagential contact of the wheels of the wheelchair, and can rise no more. At this point; the locking plate 23 tends to engage inside the teeth of the ratchet gears 24 and 25, thus preventing the said flap from rotating down, and thus provides securement for the wheelchair FIG. 1 and FIG. 3.

The down motion of the said flap 12 and 13 is only accomplished when the push button is pushed to "off" position, thus reversing the solenoid valve to exhaust air from cylinder 19 and open the port to pressurize cylinder 20 to retract thus allowing the rocker arm 29 to push the ratchetgear lock sliding plate 23 away from the ratchet gear teeth and alows the holding flap 12 to rotate freely to down position.

It must be noted that the duplicated mirror image of the exact mechanisms as described above is also located under the holding flap 13 for the rear side of the wheelchair wheels, and the exact simultaneous motion is achieved instantly when the solenoid valve is energized or de-energized by the push button.

Description—FIG. 5,6

The FIG. 5 is an illustration of another version of my invention, where as the holding flaps 12 and 13 in FIG. 4 are being revised into four segmented individual holding flaps 32 FS and 32 RS and 37 FS and 37 RS(not shown in FIG. 5 for simplicity).

The axial shaft assembly in FIG. 4 is also being revised to an square cross sectional solid shaft or square tubing to facilitate the sliding movement of the individual holding flap members 32FS and 32RS. The said holding flaps will slide on the shafts 33 by means of an air cylinderor or a linear actuator 36, attached to the base frame assembly 11 and having it's rod attached to a blade 35. The said blade works inside the grooves of the sliding member of the said holding flaps that their square holes slide on the square shafts.

To the said blade 35 is attached an infrared sensor 34 viewing upward which functions as a large wheel tire center detector, which locates the center of the tire and transmits signal to a relay which in turn operates the motor of the said linear actuator 36.

Since the variation between the shortest and longest distance of the large wheels of the wheelchair is rarely more than 4 inch; therefore the function of the slide mechanism is to provide search and locate within a 5 inch range distance. No need to mention that the top plate 16 provides a 5 inch long slotted hole for the emission beams of the said infrared sensor 34.

The holding flaps 37FS (front side) and 37 RS(rear side which is not shown in FIG. 5) tend to hold wheel 39 and both are fixed and non sliding on the shafts 33.

Operation—FIGS. 1, 3, 4

Once the large rear wheels of the wheelchair are positioned on the plate 16 as shown in FIG. 1 and FIG. 3; by pressing a push button (not shown) a 4 way two position 12 volt DC solenoid valve 30 is energized,thus opening the port forair pressure to the cylinder 19 and the semilar on the opposit side (not shown) FIG. 4, in order to raise the holding flaps 12 and 13 as far as to contact the large rear wheels of the wheelchair FIGS. 1 and 3.

An optional rubber mat 14 can be glued to the holding flaps surface for better grip.

By buckling up the shoulder and the lap straps, the wheel chair occupant is secured in the event of accident or sudden stop of the vehicle.

The securement activation or deployment may be accomplished also by the driver from drivers seat.

Operation—FIGS. 5, 6

Once the large wheel 39 of the wheelchair is located on the proper location by the aid of stop guide 43 on the top plate 16, by pushing the push button the start of electronic search for finding the center of the tire 38 will begin. Sequentially; after the tire location is established, the air cylinder 19 (only front side is shown)will raise all four holding flaps to contact the wheels tangentially. The ghost lines shown in FIG. 5 indicate the rise mode of the said holding flaps 32FS, 32RS, and 37FS and similar on the rear side( not shown).

Obviously the rotation of shafts 33 causes the rotation of the ratchet gears which provides the locking system of the said holding flaps.

The operation of the ratchet mechanism in this embodiment of my invention is exactly same as described for FIG. 4. The actuation of cylinder 19 and 20 is accomplished by the same type of solenoid valve 30 in FIG. 4 which is not shown in FIG. 5.

A telescopic powered sliding cover shown in FIG. 6, will cover the front and rear mechanisms of the securement device. The said cover is not a part of this alternate design of my invention, therefore detailed description of it is omitted.

SUMMARY, RAMIFICATIONS, AND SCOPE

Although the description above contains many specifities these should not be construed as limiting the scope of my invention, but as merely providing illustrations of some of the preferred embodiments of my invention.

For example in another embodiment of the present invention the wheelchair securement holding flaps may be comprised of four individual flaps, two of which for frontal side of the large wheels and two for the rear side of the large wheels.

In another embodiment of the present invention FIG. 5; two of the four securement holding flaps may be fixed on one side and the other two for other side are of a travelling nature and articulate by means of an air cylinder or linear actuator which is guided by an electronic wheel tire search sensor such as infrared which will stop at the exact middle width of the wheelchair tire. The operational functions of such embodiment mechanisms is exactly same as my described invention.

I claim as my invention:

1. A safety device for a moving vehicle for restraining an occupied wheelchair having at least a first and a second wheel, said safety device comprising:

a platform for supporting the wheelchair;

first and second flaps mounted to one side of said platform for pivotally engaging the first wheel of the wheelchair, said first and second flaps being fixed to prevent transverse movement of the flaps;

third and fourth flaps mounted to the other side of said platform for pivotally engaging the second wheel of the wheelchair, said third and fourth flaps being mounted to move transversely with respect to said platform;

a first drive means for pivoting said first and third flaps;

a second drive means for pivoting said second and fourth flaps;

a third drive means for moving said third and fourth flaps transversely;

sensor means mounted on said third and fourth flaps for sensing when the transverse movement of the third and fourth flaps has them in an aligned position under the second wheel of the wheelchair; and means for stopping the third drive means upon a signal from said sensor means indicating that said third and fourth flaps are in said aligned position.

* * * * *